United States Patent [19]

Davy

[11] 4,400,734
[45] Aug. 23, 1983

[54] COLUMN DEFECT COMPENSATING APPARATUS FOR CCD IMAGE SENSOR

[75] Inventor: Lee N. Davy, Rochester, N.Y.

[73] Assignee: Eastman Kodak Company, Rochester, N.Y.

[21] Appl. No.: 315,762

[22] Filed: Oct. 28, 1981

[51] Int. Cl.³ .......................... H04N 5/14; H04N 3/15
[52] U.S. Cl. ..................................... 358/163; 358/213
[58] Field of Search ............ 357/24 LR, 30; 358/213, 358/212, 163, 167; 307/221,D

[56] References Cited

U.S. PATENT DOCUMENTS

| | | | |
|---|---|---|---|
| 4,155,121 | 5/1979 | Jambotkar | 365/200 |
| 4,167,754 | 9/1979 | Nagumo et al. | 358/167 |
| 4,179,711 | 12/1979 | Nagumo | 358/213 |
| 4,300,163 | 11/1981 | Wada et al. | 358/163 |

OTHER PUBLICATIONS

"Charge Transfer Devices" by Sequin and Thompsett, Academic Press, 1975, p. 153.

Primary Examiner—John C. Martin
Attorney, Agent, or Firm—Thomas H. Close

[57] ABSTRACT

Column defect compensating apparatus for a charge coupled device (CCD) image sensor of the type having a two-dimensional array comprising rows and columns of charge transfer elements, and an output CCD shift register arranged across one end of the columns includes an auxiliary shift register clocked in synchronism with the output shift register, and containing information representing the location of defective columns in the two-dimensional array. A signal processing circuit responsive to the output of the auxiliary shift register processes the output of the array to compensate for the column defects. In a preferred embodiment of the invention, the auxiliary shift register is a CCD shift register, and a plurality of programable input circuits are provided for inserting, in parallel, into the auxiliary CCD shift register, signals representing the condition of the columns of the array. The programable input circuits include input diodes disposed adjacent the cells of the auxiliary shift register for providing a source of signal charge, input gates disposed between the diodes and the respective cells of the auxiliary shift register for selectively isolating the diodes from the cells, and selectively destructible conductors for controlling the transfer of charge from the diodes past the input gates.

3 Claims, 4 Drawing Figures

COLUMN DEFECT COMPENSATING APPARATUS FOR CCD IMAGE SENSOR

BACKGROUND OF THE INVENTION

1. Field of the Invention

The present invention relates to solid state charge coupled device image sensors and more particularly to apparatus for compensating for column defects in such image sensors.

2. Description of the Problem

The use of solid state charge coupled device (CCD) area array image sensors is well known in the art. Several readout organizations for such CCD area array image sensors are known, including line addressed, frame transfer, and interline transfer-type devices. See for example, "Charge Transfer Devices" by Sequin and Tompsett, Academic Press Inc., 1975, page 153. These readout organizations share the feature that rows (or columns) of charge packets are shifted in parallel into a CCD output register from which they are read out serially. For example, in the frame transfer type device, an imagewise pattern of photocharges is accumulated in a two-dimensional array of image sensing elements. The photocharges are then quickly shifted to a two-dimensional storage array. Rows of photocharge are shifted in parallel from the storage array into an output register, and the rows are read out serially.

Although it is a goal to manufacture such image sensors free from defects, this goal is difficult to achieve in practice. Several forms of defects arising in the manufacturing process, such as intralevel shorts between the electrodes, small breaks or partially missing electrodes, an extension of the channel stopping dopants into a channel, or a pinhole in the gate oxide acting as a sink for minority characters cause entire columns of photocharge to be so noisy as to be unusable. The affect of the noise appears as a vertical bar in the image reproduced from the signal. Since the yield of perfect devices without column defects is relatively low, but the yield of devices with only a few bad columns is relatively high, there is a large incentive to compensate for the bad columns in the output of such devices so that less than perfect sensors may be used.

Previous approaches to defect compensation have been directed toward individual elements, for example, see U.S. Pat. No. 4,167,754 issued to Nagumo et al, Sept. 11, 1979, which describes the use of a separate programable read/only memory (PROM) containing the coded location of each defective element in a CCD area array. The PROM is addressed while the image sensor is operated and readout of the sensor is effected by enabling a sampling and hold circuit at the output of the array only when a signal from a nondefective element is produced. This method has the effect of replacing the signal from the defective element with the signal from an adjacent nondefective element. Although the coding scheme employed by Nagumo et al significantly reduces the size of the required PROM, the electronics used to address the PROM and decode the information stored therein, still adds significantly to the cost of the defect compensation circuit. In addition, for column defects, the disclosed scheme would contain one correction code word for each element in a defective column, e.g. 500 correction words if the sensor had 500 rows of sensor elements. Another approach to defect compensation disclosed in U.S. Pat. No. 4,179,711 to Nagumo, issued Dec. 18, 1979, employs a duplicate solid state image sensor over which is disposed a mask having a pattern representative of the location of the defective sensor elements. The duplicate image sensor is uniformly exposed with light and is read out in synchronism with the main sensor. The signals produced by the duplicate image sensor are employed to gate a sample and hold circuit as described above to replace the signals from defective elements with signals from adjacent nondefective elements. This approach is likewise expensive since an entire extra image sensor needs to be provided.

The problem faced by the inventor therefore, was to provide a simple, inexpensive apparatus for compensating for column defects in a CCD area array image sensor.

SOLUTION TO THE PROBLEM—SUMMARY OF THE INVENTION

The above noted problems are solved according to the present invention by providing a column defect compensating apparatus having an auxiliary shift register with a plurality of cells corresponding to the columns of the two dimensional array. The auxiliary shift register contains signals representing the condition of the columns, and is clocked in synchronism with the output shift register of the image sensing array. A noise correction circuit responds to the signals from the auxiliary shift register to correct the signals from the image sensing array. In a preferred embodiment of the invention, the auxiliary shift register is a CCD shift register, and a signal pattern indicative of the defective columns in the image sensing array is introduced in parallel into the cells of the auxiliary CCD shift register through a plurality of programable diode inputs having a diode, a gate disposed between the diode and the corresponding cell of the CCD, and a selectively destructible conductor for controlling the transfer of charge from the diode to the cell of the CCD. In one embodiment of the invention, the diode is connected to a constant source of bias potential, and the input gate is connected to both a constant source of potential and a clocked potential. One or the other of the connections to the input gate is disrupted to select the pattern of information input into the auxiliary CCD shift register. In an alternative embodiment, the electrical connection to the diode is selectively disruptible to program the input to the auxiliary shift register.

BRIEF DESCRIPTION OF THE DRAWINGS

The invention will be described with respect to the accompanying drawings, wherein.

DESCRIPTION OF THE PREFERRED EMBODIMENTS

The construction and operation of CCD image sensors being well known in the art, only features related directly to the present invention will be described in detail. The remaining features may be selected from those in the art.

Figure 1:
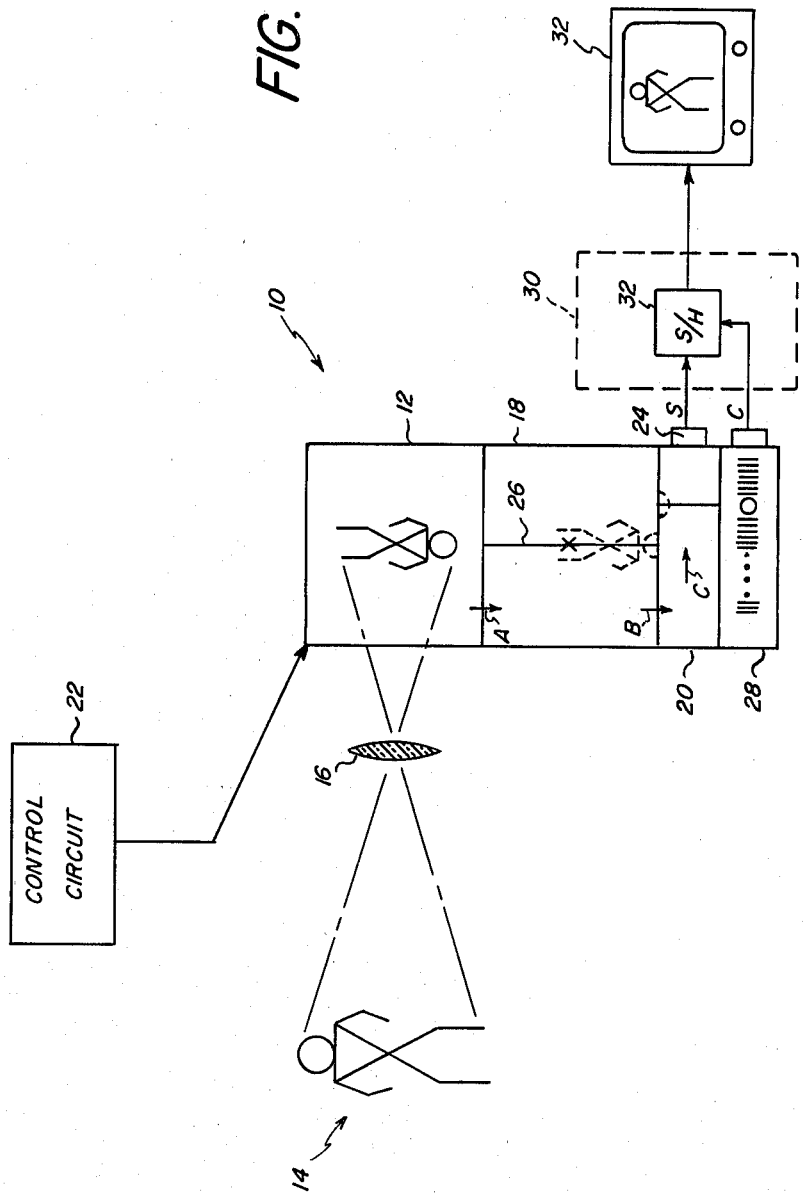
FIG. 1 is a schematic diagram showing a CCD image sensor of the frame transfer variety with column defect compensating apparatus according to the present invention.

Turning first to FIG. 1, a CCD image sensor of the frame transfer type, generally designated 10, is shown. The image sensor includes: (1) an imaging array 12 comprising rows and columns of image sensing elements upon which an object 14 is imaged by a lens 16; (2) a frame storage array 18; and (3) an output shift register 20. The image sensor 10 is supplied with clock signals from a control circuit 22. In a frame transfer type image sensor, an imagewise charge pattern is accumulated in the image sensing array 12 during an exposure interval. The imagewise pattern of charge, consisting of rows and columns of charge packets, is then quickly shifted under the control of clock signals from the control circuit 22 into the frame storage array 18 in the direction of arrow A in FIG. 1. From the frame storage array, the charge pattern is read out one row at a time through the output shift register 20. A row of the imagewise charge pattern is transferred in parallel as indicated by arrow B into the output shift register, then the charge packets are shifted serially in the direction of arrow C to an output diode 24, forming the sampled video signal S. The timing and control of all the charge transfers are effected by clock signals from the control circuit 22. As noted above, a defect in the image sensor can give rise to the loss of an entire column of information. Such a defect is indicated schematically by an "X" in the frame storage array 18 in FIG. 1. The lost column of information is indicated by a vertical line 26 through the image.

The column defect compensating apparatus according to the present invention comprises an auxiliary shift register 28, containing signals representative of the locations of defective columns of the image sensor and a signal processing circuit 30 responsive to the signal from the output shift register 30 and the defect location signal from the auxiliary shift register 28 for compensating for the column defects. An example of such a signal processing circuit is shown as a sample and hold circuit 32. The sample and hold circuit 32 samples the output signal S from output shift register 20 each time a "no defect" signal is received from auxiliary shift register 28 indicating that there are no column defects. The "no defect" signals are represented as logical "one"s and the absence of a "no defect" signal is represented as a logical "0" in auxiliary shift register 28. This scheme has the effect of replacing the signal from a detective column with the signal from a neighboring nondefective column, since the output of the sample and hold circuit is not updated until the next nondefective signal is available from the output register. When the defect compensated signal is displayed, for example on a television monitor 32, the appearance of the column defect is suppressed.

Figure 2:
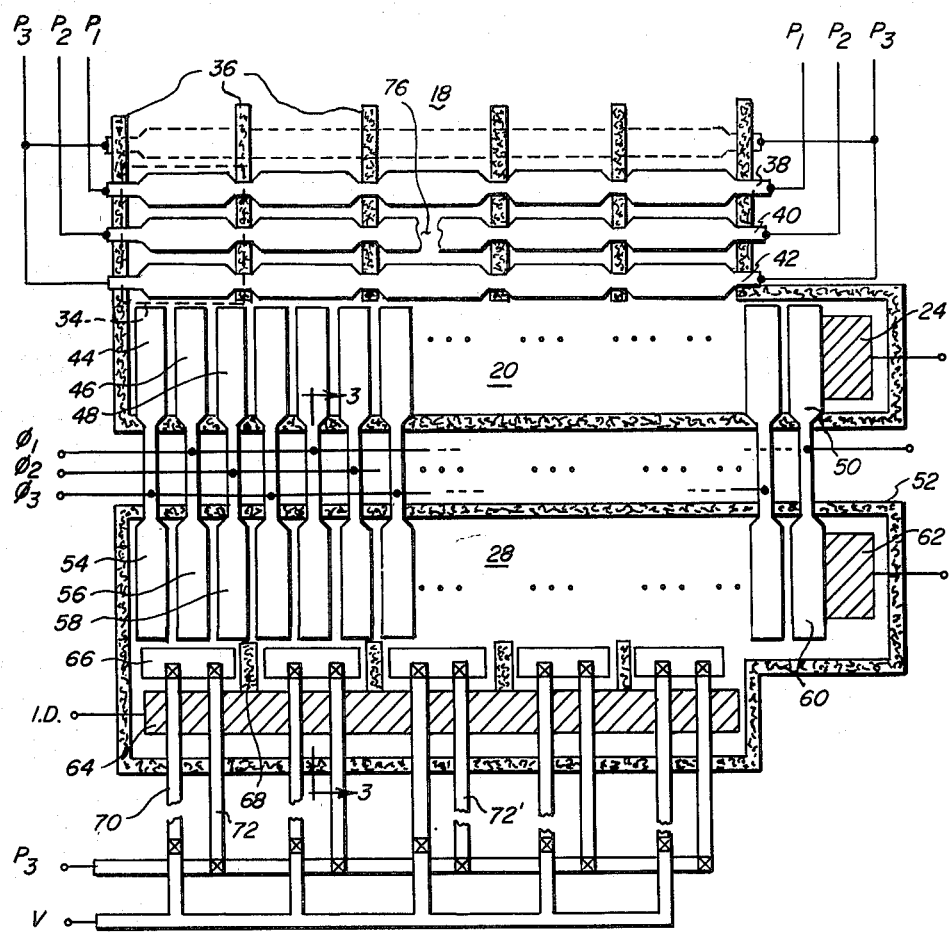
FIG. 2 is a schematic diagram showing the construction of one embodiment of the auxiliary shift register employed with the defect compensating apparatus of the present invention.

Turning now to FIG. 2, one embodiment of the auxiliary shift register 28 according to the present invention, will be described in more detail. For purposes of description, a three-phase CCD is shown in FIG. 2, it being understood that one-, two-, or four-phase CCD's may also be employed with the present invention. The output shift register 20 and the last row of charge storage cells in the frame storage array of a frame transfer type image sensor are shown. The charge storage cells 34 are defined by channel stopping regions 36 and first-, second-, and third-phase electrodes 38, 40 and 42 respectively, supplied by three-phase clock signals $P_1$, $P_2$, $P_3$ respectively. Output shift register 20 comprises a linear array of three phase electrodes 44, 46 and 48, supplied by three-phase clock signals $\Phi_1$, $\Phi_2$, and $\Phi_3$ respectively; an output gate 50; and an output diode 24. The auxiliary shift register 28 according to the present invention comprises a channel stopping diffusion 52 which defines an elongated channel adjacent the output shift register 20. A linear array of three-phase charge transfer electrodes 54, 56, and 58 are disposed over the channel area and are formed by extensions of the electrodes of the output shift register 20. An output gate 60 which is formed by an extension of output gate 50, and output diode 62, complete the auxiliary shift register.

An elongated input diode 64 is disposed adjacent the charge transfer cells of the auxiliary shift register, and disposed between each cell and the input diode 64 is an input gate 66 for controlling the introduction of signal charges from the input diode to the cells. Channel stopping diffusion 68 isolates the gates from each other. Each gate is connected to two input lines by a pair of connections 70 and 72 composed of final metal, i.e. the connecting lines are fabricated at the surface of the device for reasons to be explained later.

Connecting line 72 is connected to a clock input that is synchronous with clock signal $P_3$. Connecting line 70 is connected to a constant voltage source V.

To program the auxiliary shift register the image sensor is operated and the output signal is displayed and observed to determine the location of the defective columns. For each defective column, the continuity of the connecting line 72 connecting the input gate of the corresponding cell of the auxiliary shift register to the $P_3$ clock signal is destroyed by using well known laser apparatus of the type that is employed to trim thin film components such as resistors. Conversely, for each nondefective column, the continuity of the connecting line 70 connecting the input gate of a corresponding cell of the auxiliary shift register to fixed potential V is destroyed.

Figure 3:
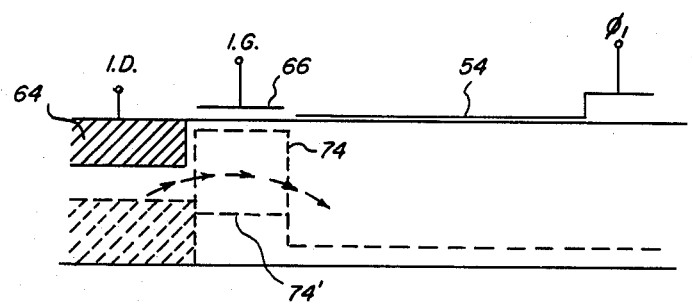
FIG. 3 is a potential diagram used in describing the operation of the auxiliary shift register shown in FIGS. 2 and 4.

The operation of the auxiliary shift register will now be described with reference to FIG. 3. FIG. 3 is a potential diagram illustrating the potential profile in a cross section of the auxiliary shift register through the phase-1 electrode 54 taken along line 3—3 in FIG. 2.

Normally, the voltage on the input gate 66 is maintained so that a potential barrier indicated by dotted line 74 in FIG. 3 is formed between the input diode 64 and the potential well formed by the phase-1 electrode 54. To transfer charge from the input diode 64 to a cell of the auxiliary shift register 28, the voltage on the input gate 66 is temporarily changed to lower the potential barrier to the level denoted 74', thereby allowing charge to flow from the diode, over the barrier, into the cell of the shift register. All of the input gates supplied with the $P_3$ signal through connecting line 72 behave in this manner, filling the cells of the auxiliary shift register with charge packets representing logical ones (1) each time a row of photocharge is transferred into the output shift register 20.

In contrast, the input gates that are supplied with signal via connecting line 70 are supplied with a constant potential V that maintains the potential barrier 78 high at all times, thereby preventing any charge from reaching the respective cells of the auxiliary shift register. These empty cells represent logical zeros (0) in the auxiliary shift register, indicating the presence of a defective column in the image sensing array.

In FIG. 2, a defect 76 (represented by a break in transfer gate 40, in the third column of the frame storage area) is illustrated. Defect 76 causes a loss of information in the third column of the sensor. The line 72' connecting the corresponding input gate of the third cell of the auxiliary shift register is shown broken, thereby causing a zero (0) to appear in the output of the shift register when the image sensor is operated. For all the other cells of the auxiliary shift register, the line 70 is broken, thereby causing a one (1) to appear in output of the shift register when the image sensor is operated.

Figure 4:
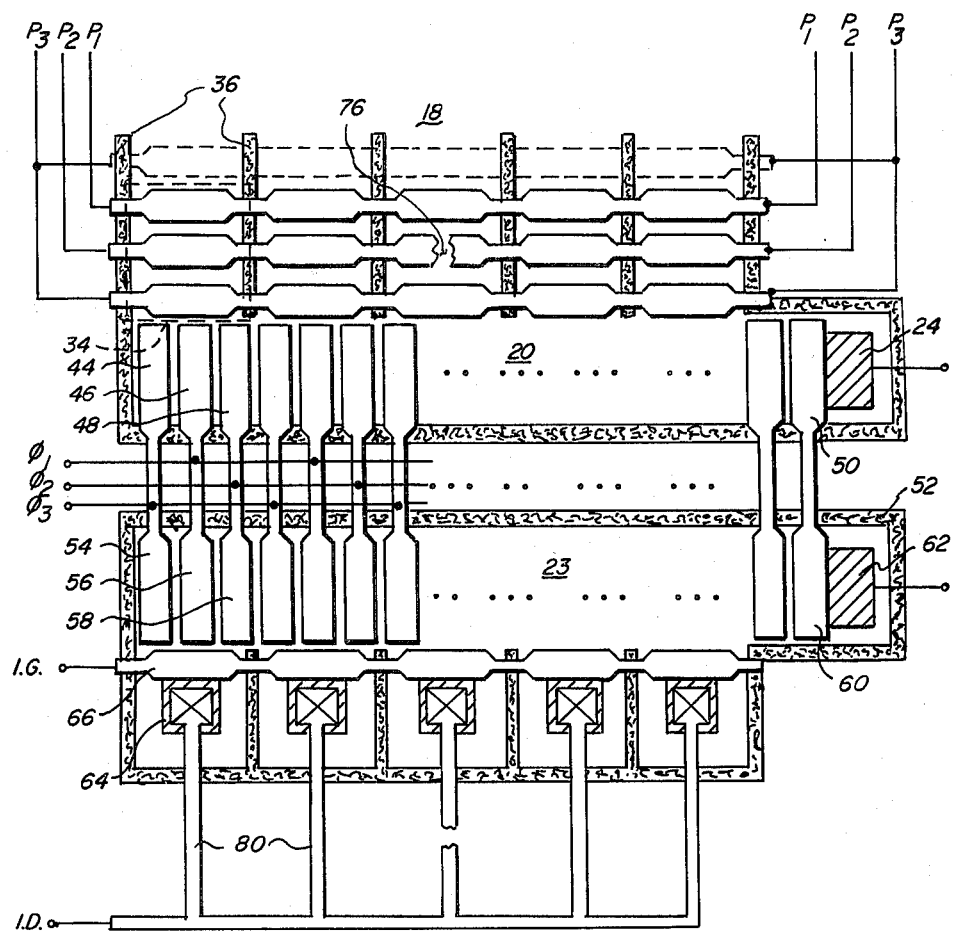
FIG. 4 is a schematic diagram showing an alternative embodiment of an auxiliary shift register employed with the present invention.

An alternative configuration of the auxiliary shift register is shown in FIG. 4 wherein elements similar to those in FIG. 2 are similarly numbered. In this configuration, a separate input diode 64 is provided for each cell of the auxiliary shift register. All of the input diodes are connected to a diode bias potential by connecting lines 80, and the input gate 66 is continuous for the length of the shift register. The auxiliary shift register 28 is programmed by disrupting the continuity of line 80 to the appropriate input diodes, thereby disrupting the supply of charge carriers available for filling the corresponding cells of the shift register. In this example, only those lines where a logical zero (0) is desired in the shift register are disrupted, thereby decreasing the number of lines that need to be broken to program the auxiliary shift register. The device shown in FIG. 4 can be operated either by pulsing the diode bias in synchronism with the P₃ signal, and keeping the potential of the input gate 66 constant thereby periodically spilling charge over the fixed barrier formed by input gate 66, or by pulsing the input gate 66 to periodically lower the potential barrier while keeping the diode bias constant.

The invention has been described with respect to preferred embodiments thereof, but it will be recognized that modifications and variations may be effected within the spirit and scope of the invention. For example, the invention has been described in terms of column defect compensating apparatus, however, the use of the word "column" herein is intended to be descriptive, but not limiting to one particular orientation of the image sensor.

I claim:

1. Column defect compensating apparatus for a charge coupled device (CCD) image sensor of the type having a two-dimensional array comprising rows and columns of charge transfer elements, and an output CCD shift register arranged across one end of the columns and adapted to receive in parallel, one row of charge packets and to deliver the charge packets serially under control of clock signals to an output location, the column defect compensating apparatus comprising:

auxiliary CCD shift register means having a plurality of cells corresponding to the columns of the two-dimensional array for producing signals representing the condition of said columns;

means for applying said clock signals to said auxiliary shift register means to produce said condition representative signals in synchronism with the delivery of the charge packets in the output shift register to the output location;

programable input means for inserting, in parallel, into said auxiliary shift register, signals representing the condition of the columns of the array; said programable input means comprising (1) diode means disposed adjacent said cells of said auxiliary shift register for providing a source of signal charge, (2) gate means disposed between said diode means and said cells for selectively isolating said diode means from said cells, and (3) selectively destructible conductor means for controlling the transfer of charge from said diode means past said gate to said cells; and signal processing circuit means responsive to the signals the said auxiliary shift register for compensating for the column defects in the output of the image sensor.

2. The invention claimed in claim 1 wherein said selectively destructible conductor means comprises a first conductor connected to said gate means and adapted to be connected to a fixed potential and a second conductor connected to said gate means and adapted to be connected to a clocking signal.

3. The invention claimed in claim 1 wherein said selectively destructible conductor means comprises conductor means connected to said diode.

* * * * *